(12) United States Patent
Yanobu et al.

(10) Patent No.: US 9,376,033 B2
(45) Date of Patent: Jun. 28, 2016

(54) INSULATING SECTION, POWER FEEDING RAIL, AND TRACK TRANSPORTATION SYSTEM

(71) Applicant: MITSUBISHI HEAVY INDUSTRIES, LTD., Minato-ku, Tokyo (JP)

(72) Inventors: Yukihide Yanobu, Tokyo (JP); Toshiaki Asanoma, Tokyo (JP); Yasuyuki Mukai, Tokyo (JP); Hiroyuki Kono, Tokyo (JP); Katsuaki Morita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 32 days.

(21) Appl. No.: 14/403,449

(22) PCT Filed: Feb. 21, 2013

(86) PCT No.: PCT/JP2013/054373
§ 371 (c)(1),
(2) Date: Nov. 24, 2014

(87) PCT Pub. No.: WO2014/030364
PCT Pub. Date: Feb. 27, 2014

(65) Prior Publication Data
US 2015/0114778 A1    Apr. 30, 2015

(30) Foreign Application Priority Data

Aug. 24, 2012 (JP) ................. 2012-185286

(51) Int. Cl.
*B60M 1/00* (2006.01)
*B60M 1/18* (2006.01)
*B60M 1/30* (2006.01)

(52) U.S. Cl.
CPC *B60M 1/18* (2013.01); *B60M 1/305* (2013.01)

(58) Field of Classification Search
CPC ........... B60M 1/18; B60M 1/305; B60M 1/16
See application file for complete search history.

(56) References Cited

U.S. PATENT DOCUMENTS

| | | | | |
|---|---|---|---|---|
| 3,757,059 A | * | 9/1973 | Falkiner-Nuttall | .... B60M 1/305 191/29 DM |
| 3,790,725 A | * | 2/1974 | Charamel | .............. B60M 1/346 191/29 R |

(Continued)

FOREIGN PATENT DOCUMENTS

| | | |
|---|---|---|
| CN | 1571739 A | 1/2005 |
| GB | 1353865 A | 5/1974 |

(Continued)

OTHER PUBLICATIONS

China Patent Office, "Office Action for CN 201380029619.9," Dec. 4, 2015.

(Continued)

*Primary Examiner* — Jason C Smith
(74) *Attorney, Agent, or Firm* — Manabu Kanesaka

(57) ABSTRACT

In an insulating section, a power feeding rail, and a track transportation system, the insulating section extending along a travel direction of a vehicle and connecting electric train lines coming into contact with a pantograph of the vehicle at a contact surface facing the vehicle is characterized by including: a main surface portion formed on a surface which follows a current-conducting surface coming into contact with the pantograph in the electric train line, and having a portion in which a width in an up-down direction orthogonal to the travel direction is larger than the width of the pantograph; and inclined surface portions provided on both sides in the up-down direction on at least the near side in the travel direction of the main surface portion, inclined so as to gradually approach the vehicle as it goes toward the far side from the near side in the travel direction, and connected to the main surface portion.

12 Claims, 10 Drawing Sheets

(56) References Cited

U.S. PATENT DOCUMENTS

| | | | | |
|---|---|---|---|---|
| 5,310,032 | A * | 5/1994 | Plichta | B60M 1/302 191/22 DM |
| 6,286,646 | B1 * | 9/2001 | Van Zijverden | B60L 5/36 191/45 R |
| 7,703,589 | B2 * | 4/2010 | Kalitzki | B60M 1/307 191/22 R |
| 8,544,389 | B2 * | 10/2013 | Kono | B61B 5/02 104/130.07 |
| 8,851,253 | B2 * | 10/2014 | Asplund | B60L 5/42 104/243 |
| 8,875,857 | B2 * | 11/2014 | Asplund | B60L 5/40 191/10 |
| 8,887,883 | B2 * | 11/2014 | Furrer | B60M 1/305 191/40 |
| 2009/0205915 | A1 * | 8/2009 | Kashiwa | B60L 5/39 191/49 |
| 2010/0133055 | A1 * | 6/2010 | Melis Maynar | B60M 1/30 191/39 |
| 2010/0187322 | A1 * | 7/2010 | Reichle | E01B 26/005 238/14.2 |
| 2014/0144672 | A1 * | 5/2014 | Furrer | H01B 17/02 174/138 R |
| 2014/0339040 | A1 * | 11/2014 | Mukai | B60M 1/305 191/29 R |
| 2015/0114778 | A1 * | 4/2015 | Yanobu | B60M 1/305 191/39 |
| 2015/0283921 | A1 * | 10/2015 | Zimmerman | B60M 1/12 191/38 |

FOREIGN PATENT DOCUMENTS

| | | |
|---|---|---|
| JP | S59-174932 U | 11/1984 |
| JP | S60-148132 U | 10/1985 |
| JP | S62-241743 A | 10/1987 |
| JP | H04-278845 A | 10/1992 |
| JP | H09-301018 A | 11/1997 |
| JP | H11-139185 A | 5/1999 |
| JP | H11-278110 A | 10/1999 |
| JP | 2013-159181 A | 8/2013 |

OTHER PUBLICATIONS

Singapore Patent Office, "Notice of Allowance for SG 11201407918Q," Jun. 23, 2015.
PCT/ISA/210, "International Search Report for PCT/JP2013/054373," May 28, 2013.
PCT/ISA/237, "Written Opinion of the International Searching Authority for PCT/JP2013/054373," May 28, 2013.

* cited by examiner

INSULATING SECTION, POWER FEEDING RAIL, AND TRACK TRANSPORTATION SYSTEM

RELATED APPLICATIONS

The present application is National Phase of International Application No. PCT/JP2013/054373 filed Feb. 21, 2013, and claims priority from Japanese Application No. 2012-185286, filed Aug. 24, 2012, the disclosure of which is hereby incorporated by reference herein in its entirety.

TECHNICAL FIELD

The present invention relates to a power feeding rail which performs power feeding from a lateral electric train line with respect to a vehicle.

This application claims the right of priority based on Japanese Patent Application No. 2012-185286 filed with the Japan Patent Office on Aug. 24, 2012, the contents of which are incorporated herein by reference.

BACKGROUND ART

As new transportation means alternative to a bus or a railway, a track transportation system is known in which a vehicle travels on a track with traveling wheels each composed of a rubber tire and guide wheels provided on both sides or at a lower portion of the vehicle are guided by guide rails provided on both sides or at a central portion of the track. Such a track transportation system is generally called a new transportation system or an automated people mover (APM).

Then, a power feeding rail is provided on the side of the track of the track transportation system described above. A pantograph provided on the side of the vehicle faces the power feeding rail and slides in contact with the power feeding rail, whereby power feeding to the vehicle is performed.

Here, in the power feeding rail, an insulating section which is in an insulating state as a separator of a feeding section is installed every several hundred meters between electric train lines electrically conducting to a feeder.

Then, the above-described insulating section is generally made by interposing compressed laminated wood between the electric train lines. However, in such an insulating section, since occurrence of wear, concavity, or the like is significant due to the pantograph sliding in contact therewith, deterioration is early, and thus a replacement frequency increases.

Therefore, in view of such a problem, PTL 1 discloses an insulating section configured by installing electric train lines with an approach plate provided at an end portion so as to be adjacent to each other in a travel direction and disposing the approach plates of the respective electric train lines in a state of being separated from each other. Then, the approach plate is composed of metal or fiber-reinforced plastic (FRP) and thus has excellent wear resistance, and therefore, it is possible to attain improvement in maintainability.

CITATION LIST

Patent Literature

[PTL 1] Japanese Unexamined Patent Application Publication No. 4-278845

SUMMARY OF INVENTION

Technical Problem

However, in the insulating section disclosed in PTL 1, a contact sliding surface of a current collector (a pantograph) sliding in contact with the approach plate is set to a width dimension of half or less compared to a contact sliding surface of the electric train line. For this reason, contact surface pressure when the current collector slides in contact with the approach plate becomes higher, and thus there is a possibility that wear of the pantograph may increase.

The present invention has an object to provide an insulating section, a power feeding rail, and a track transportation system in which it is possible to suppress wear of a current collector while reliably performing insulation.

Solution to Problem (1) According to a first aspect of the present invention, there is provided an insulating section which is provided to extend along a travel direction of a vehicle and connects electric train lines coming into contact with a current collector of the vehicle at a contact surface facing the vehicle, including: a main surface portion formed on a surface which follows a current-conducting surface coming into contact with the current collector in the electric train line, and having a portion in which a width in an orthogonal direction orthogonal to the travel direction of the surface following the current-conducting surface is larger than a width of the current collector; and inclined surface portions provided on both sides in the orthogonal direction on at least the near side in the travel direction of the main surface portion, inclined so as to gradually approach the vehicle as it goes toward the far side from the near side in the travel direction, and connected to the main surface portion.

According to such an insulating section, since the main surface portion is made larger than the width of the current collector, the area of the surface with which the current collector comes into contact can be increased. Therefore, a reduction in contact surface pressure becomes possible. Further, the current collector is worn due to contact with the current-conducting surface and only a contact portion with the current-conducting surface is gradually recessed in a direction approaching the vehicle. Here, since the main surface portion has a larger width than the current collector, when the current collector with the contact portion recessed in a concave shape advances from the current-conducting surface to the main surface portion, there is a possibility that the current collector may be caught in the main surface portion at end portions in the orthogonal direction of the main surface portion. In this regard, due to the inclined surface portions, the current collector recessed in a concave shape in this manner can be prevented from being caught in the main surface portion and the current collector can be guided to the main surface portion.

(2) In the insulating section according to the above (1), the main surface portion may be formed of an elastic material.

In this manner, the main surface portion is made of an elastic material, whereby the main surface portion is elastically deformed when the current collector comes into contact therewith, and thus it is possible to further reduce contact surface pressure with the current collector.

(3) In the insulating section according to the above (1) or (2), a groove recessed from the main surface portion may be formed in the main surface portion.

Due to such a groove, it is possible to discharge carbon of the current collector stuck to the main surface portion to the outside of the main surface portion through the groove with the traveling of the vehicle. In this manner, an insulation function can be prevented from being impaired by the carbon stuck to the main surface portion, and thus improvement in an insulation effect becomes possible.

(4) In the insulating section according to the above (3), the groove may be inclined in the orthogonal direction with respect to the travel direction.

By forming the groove in this manner, it is possible to more reliably discharge the carbon stuck to the main surface portion to the outside of the main surface portion, and thus further improvement in an insulation effect becomes possible.

(5) In the insulating section according to the above (4), the groove may be formed in a lattice shape.

By forming the groove in this manner, it is possible to obtain an insulation effect by reliably discharging the carbon stuck to the main surface portion to the outside of the main surface portion even if the direction of movement of the current collector which comes into contact with the main surface portion is reversed.

(6) In the insulating section according to any one of the above (1) to (5), each of the inclined surface portions may have, as the inclined surface, a first surface in which an inclination direction is directed in the orthogonal direction, and a second surface in which an inclination direction is directed in the travel direction.

The inclined surface portion is configured in this manner, whereby in a case where the current collector oscillates in the orthogonal direction, although there is a possibility that the current collector with the contact portion made in a concave shape due to wear may be caught in the main surface portion, the catching can be prevented by the first surface. Further, when the current collector with the contact portion made in a concave shape advances from the current-conducting surface to the main surface portion, there is a possibility that the current collector may be caught in the main surface portion at the end portions in the orthogonal direction of the main surface portion. However, the catching can be prevented by the second surface. In this way, it is possible to guide the current collector to the main surface portion, and thus prevention of damage to the current collector becomes possible.

(7) In the insulating section according to the above (6), each of the inclined surface portions may further have, as the inclined surface, a third surface which is inclined so as to connect the first surface and the second surface.

Due to such a third surface, even in a case where the current collector with the contact portion made in a concave shape due to wear oscillates in not only the orthogonal direction and the travel direction, but also an oblique direction inclined from the orthogonal direction to the travel direction, the current collector can be prevented from being caught in the end portions in the orthogonal direction of the main surface portion, and thus it is possible to prevent damage to the current collector by reliably guiding the current collector.

(8) In the insulating section according to any one of the above (1) to (5), each of the inclined surface portions may have, as the inclined surface, a curved surface in which an inclination direction smoothly changes from the orthogonal direction to the travel direction.

Due to such a curved surface, in not only a case where the current collector with the contact portion made in a concave shape due to wear oscillates in the orthogonal direction and the travel direction, but also a case where the current collector oscillates in any oblique direction inclined from the orthogonal direction to the travel direction, the current collector can be prevented from being caught in the main surface portion, and thus it is possible to prevent damage to the current collector by reliably guiding the current collector to the main surface portion.

(9) The insulating section according to any one of the above (1) to (8) may further include: a first portion which is connected to the electric train lines, a second portion which overhangs from the first portion further in the orthogonal direction than the electric train lines, and a first elastic member which is provided between the first portion and the second portion and is elastically deformed, thereby relatively moving the second portion in a direction of being separated from the vehicle.

Due to such a first elastic member, when end portions in the orthogonal direction of the current collector with the contact portion made in a concave shape due to wear press the second portions in a direction of being separated from the vehicle, the second portions relatively move so as to be separated from the vehicle. For this reason, impact on the current collector can be mitigated, and thus suppression of damage to the current collector becomes possible.

(10) The insulating section according to the above (9) may further include: a second elastic member which is provided in the first portion and elastically deformed, thereby relatively moving the first portion in a direction of being separated from the vehicle.

Due to such a second elastic member, impact due to a reaction force from the first portion acting on the current collector in a direction approaching the vehicle can be mitigated, and thus suppression of damage to the current collector becomes possible.

(11) According to a second aspect of the present invention, there is provided a power feeding rail including: a plurality of electric train lines coming into contact with a current collector of a vehicle; and the insulating section according to any one of the above (1) to (10), which connects the electric train lines.

According to such a power feeding rail, the insulating section is provided with the main surface portion, whereby a reduction in contact surface pressure becomes possible. Further, the insulating section is provided with the inclined surfaces, whereby the current collector with the contact portion made in a concave shape due to wear between itself and the current-conducting surface is prevented from being caught in the main surface portion at the end portions in the orthogonal direction of the main surface portion, and thus it is possible to reliably guide the current collector to the main surface portion. Therefore, it is possible to obtain an insulation effect and to suppress wear of the current collector and damage to the current collector.

(12) According to a third aspect of the present invention, there is provided a track transportation system including: the power feeding rail according to the above (11); and a vehicle traveling by receiving power from the power feeding rail.

According to such a track transportation system, the insulating section is provided with the main surface portion, whereby a reduction in contact surface pressure becomes possible. Further, the insulating section is provided with the inclined surfaces, whereby the current collector is prevented from being caught in the main surface portion, and thus it is possible to reliably guide the current collector to the main surface portion. Therefore, it is possible to obtain an insulation effect and to suppress wear of the current collector and damage to the current collector.

Advantageous Effects of Invention

According to the insulating section, the power feeding rail, and the track transportation system related to the respective aspects of the present invention, due to the main surface portion and the inclined surface portions, it is possible to suppress wear of the current collector and damage to the current collector while reliably performing insulation.

DESCRIPTION OF EMBODIMENTS

Hereinafter, a track transportation system 1 according to an embodiment of the present invention will be described.

Figure 1:
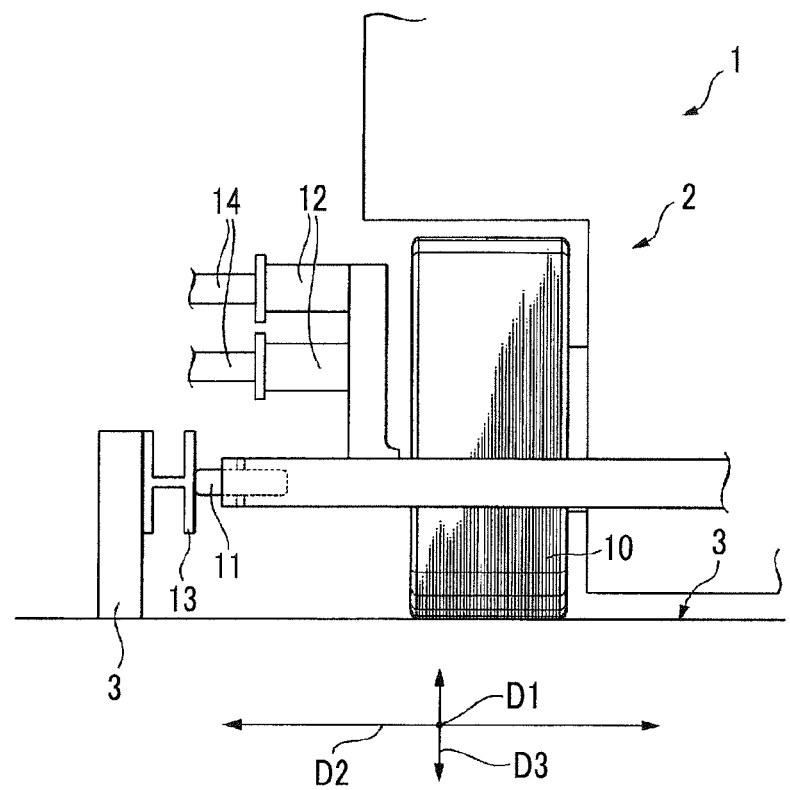
FIG. 1 is an overall schematic diagram of a track transportation system according to a first embodiment of the present invention when viewed from a travel direction of a vehicle.

A shown in FIG. 1, the track transportation system 1 is a new transportation system of a side guide type in which a vehicle 2 travels on a track 3 while being guided laterally.

The vehicle 2 is provided with a traveling wheel 10 provided so as to be able to roll on the track 3, a guide wheel 11 which is disposed further to the side opposite to the vehicle side in a width direction D2 orthogonal to a travel direction D1 than the traveling wheel 10 and made so as to be rotatable with an up-down direction (an orthogonal direction) D3 orthogonal to the travel direction D1 and the width direction D2 as an axis, and two pantographs (current collectors) 12 provided with a distance therebetween in the up-down direction D3 above the guide wheel 11.

The track 3 is provided with a guide rail 13 which faces the guide wheel 11 and guides the vehicle 2 along the travel direction D1, and two power feeding rails 14 provided with a distance therebetween in the up-down direction D3 along the travel direction D1 above the guide rail 13 and each provided so as to be able to slide in contact with each of the two pantographs 12.

Next, the power feeding rail 14 will be described.

The power feeding rails 14 are provided with a distance therebetween in the up-down direction D3 along the travel direction D1 on the side of the track 3.

Figure 2A:
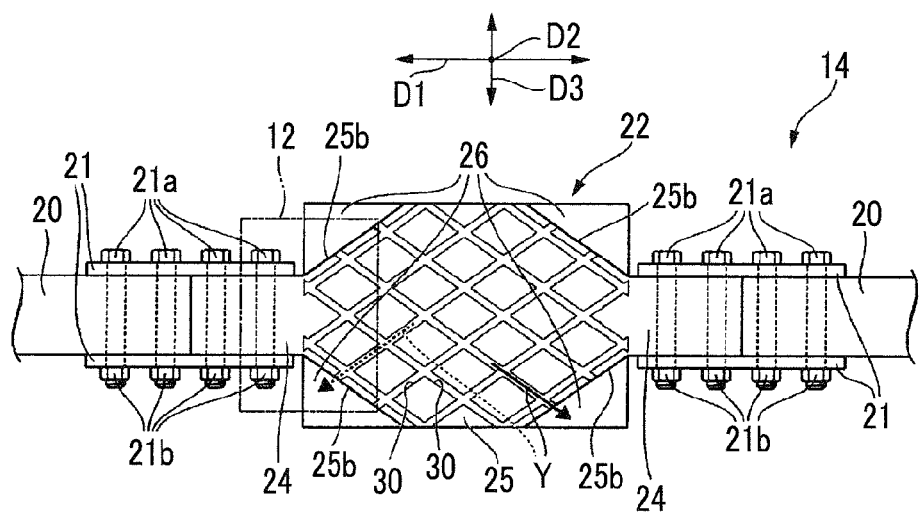
FIG. 2A is a side view showing a power feeding rail related to the track transportation system according to the first embodiment of the present invention.
Figure 2B:
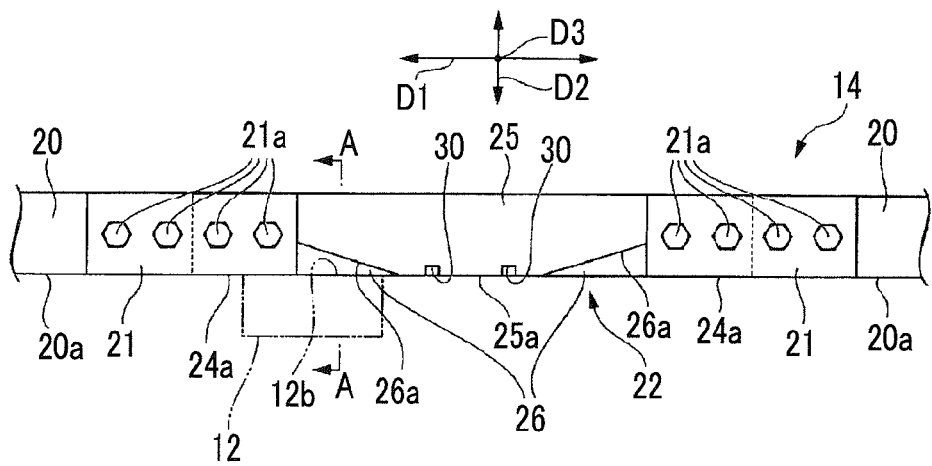
FIG. 2B is a top view showing the power feeding rail related to the track transportation system according to the first embodiment of the present invention.
Figure 2C:
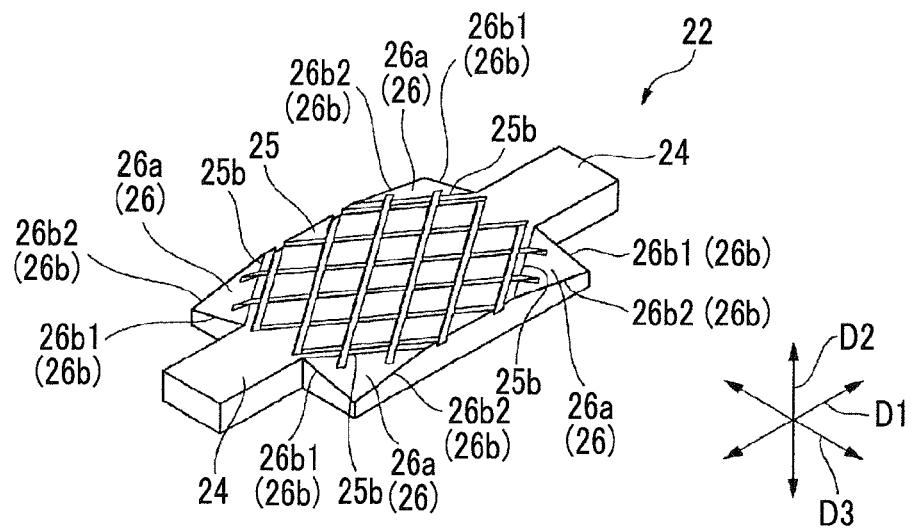
FIG. 2C is a perspective view showing an insulating section of the power feeding rail related to the track transportation system according to the first embodiment of the present invention.

Further, as shown in FIGS. 2A and 2B, each of the power feeding rails 14 has electric train lines 20 which are disposed to electrically conduct to a feeder (not shown) and with a distance therebetween in the travel direction D1, and an insulating section 22 disposed between the electric train lines 20 and connected to the electric train lines 20 by connection plates 21.

The electric train lines 20 are disposed along the travel direction D1 and electric power is supplied thereto from a feeding section (not shown) through the feeder. Each of the electric train lines 20 is provided to have a current-conducting surface 20a capable of sliding in contact with the pantograph 12 and performs power supply to the vehicle 2 through the current-conducting surface 20a.

The insulating section 22 is configured with an electrically non-conductive material such as compressed laminated wood or FRP, for example, and disposed between the electric train lines 20 adjacent to each other in the travel direction D1. Further, the insulating section 22 is provided with a main surface portion 25 which slides in contact with the pantograph 12, connection portions 24 protruding from the main surface portion 25 to both sides in the travel direction D1 and connected to the electric train lines 20, and inclined surface portions 26 provided at end portions 12a in the travel direction D1 and the up-down direction D3 of the main surface portion 25.

Each of the connection portions 24 has an outer shape formed to be the same as that of the electric train line 20. A surface 24a facing in the width direction D2 so as to follow the current-conducting surface 20a of the electric train line 20 is made flush with the current-conducting surface 20a. Further, the connection portion 24 and the electric train line 20 are sandwiched between the connection plates 21 from both sides in the up-down direction D3 in a state of being put together in the travel direction D1, and fastened by bolts 21a and nuts 21b, whereby the insulating section 22 and the electric train line 20 are connected to each other.

In the main surface portion 25, as shown in FIG. 2B, a surface 25a facing in the width direction D2 is formed to be flush with the current-conducting surface 20a of the electric train line 20 and the surface 24a of the connection portion 24 so as to follow the current-conducting surface 20a and the surface 24a. The surface 25a spreads to both sides in the up-down direction D3 as it goes toward the travel direction D1 from a connection portion with the surface 24a. That is, in this embodiment, edge portions 25b of the main surface portion 25 spread from the current-conducting surfaces 20a in the two electric train lines 20 to both sides in the up-down direction D3 through the connection portions 24, whereby the main surface portion 25 has a substantially rhombic shape when viewed from the width direction D2.

Further, the main surface portion 25 is formed such that a portion having the largest width in the up-down direction D3 is larger than the width in the up-down direction D3 of the pantograph 12.

Further, in the main surface portion 25, a groove 30 recessed in the width direction D2 from the surface 25a is formed.

Further, an extending direction of the groove 30 is inclined in the up-down direction D3 with respect to the travel direction D1. The groove 30 is formed in a lattice shape by connecting the edge portions 25b of the main surface portion 25. That is, the surface 25a of the main surface portion 25 is divided in a lattice shape by the groove 30.

The inclined surface portions 26 are provided so as to protrude toward both sides in the up-down direction D3 at all of the end portions 12a (four places) in the travel direction D1 and the up-down direction D3 in the main surface portion 25. In this way, in a case where the entirety of the main surface portion 25 and the inclined surface portions 26 is viewed from the width direction D2, a rectangular shape as a whole is formed.

Further, an inclined surface 26a which is a surface facing in the width direction D2 of each of the inclined surface portions 26 is gradually inclined to the vehicle side in the width direction D2 (in a direction approaching the vehicle 2) toward the far side from the near side in the travel direction D1, that is, toward the main surface portion 25 from the current-conducting surface 20a. More specifically, in this embodiment, the inclined surface 26a is gradually inclined from an edge portion 26b1 in the travel direction D1 and an edge portion 26b2 in the up-down direction D3 to the vehicle side in the width direction D2 and is connected to the edge portion 25b of the main surface portion 25.

In the track transportation system 1, since the width in the up-down direction D3 of the main surface portion 25 is made larger than the width in the up-down direction D3 of the pantograph 12, a surface area with which the pantograph 12 comes into contact can be made large. Therefore, a reduction in contact surface pressure acting on the pantograph 12 becomes possible.

Figure 3A:
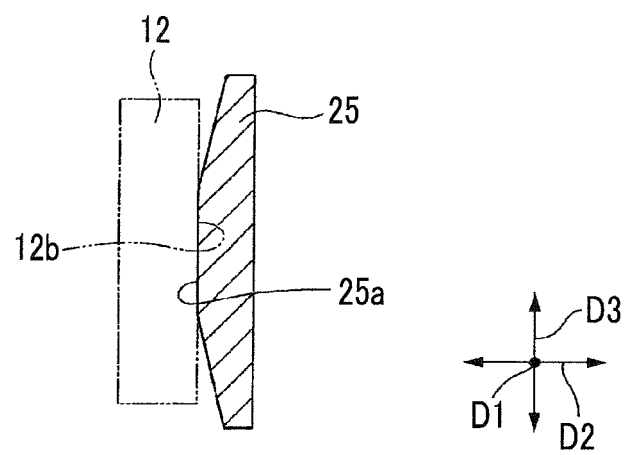
FIG. 3A is a cross-sectional view taken along line A-A of FIG. 2B, showing the relationship between the insulating section and a current collector related to the track transportation system according to the first embodiment of the present invention, and is a diagram showing a state where the current collector is not worn.

In addition, as shown in FIG. 3A, when the pantograph 12 is located on the surface 25a of the main surface portion 25 in a state where the pantograph 12 is not worn, the pantograph 12 advances toward the travel direction D1 while the pantograph 12 slides reliably in contact with the surface 25a of the main surface portion 25.

Figure 3B:
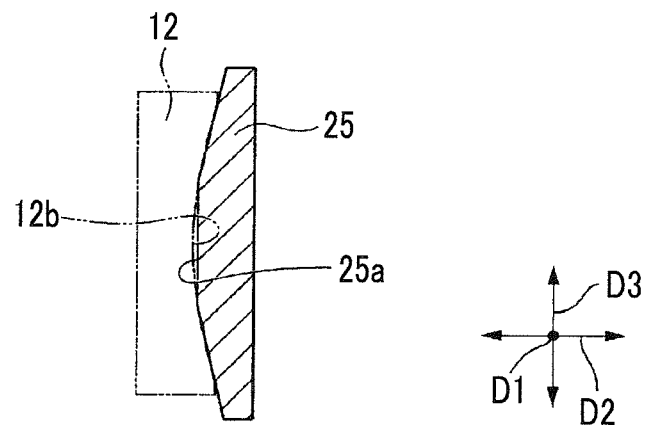
FIG. 3B is a cross-sectional view taken along line A-A of FIG. 2B, showing the relationship between the insulating section and the current collector related to the track transportation system according to the first embodiment of the present invention, and is a diagram showing a state where wear of the current collector has progressed.

In contrast, as shown in FIG. 3B, the pantograph 12 used for some period of time enters a state where wear has progressed due to sliding between itself and the current-conducting surface 20a of the electric train line 20. In such a state, a central portion (a portion sliding in contact with the current-conducting surface 20a) in the up-down direction D3 of a surface 12b of the pantograph 12 is recessed in the width direction D2, whereby the surface 12b has a concavely curved surface shape.

Figure 4:
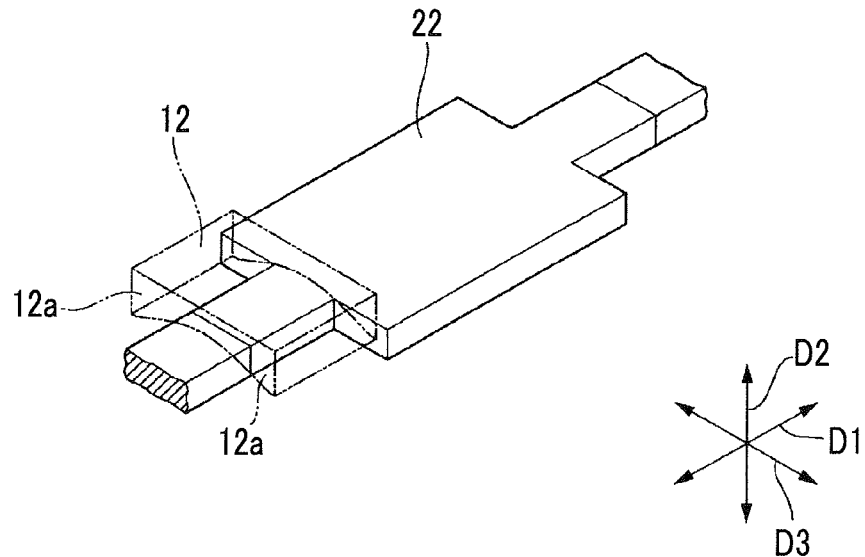
FIG. 4 is a perspective view showing a situation in which the current collector advances from an electric train line to the insulating section in a state where wear of the current collector has progressed, in a case where an inclined surface portion is not provided in the insulating section.

Here, in a case where the inclined surface portions are not provided and for example, the insulating section 22 is formed in a rectangular parallelepiped block shape simply protruding in the up-down direction D3 from the electric train line 20, or the like, as shown in FIG. 4, when the pantograph 12 advances from the current-conducting surface 20a to the insulating section 22, there is a possibility that end portions 12a in the up-down direction D3 of the pantograph 12 may be caught in the insulating section 22.

In this regard, in this embodiment, the inclined surface portions 26 are provided, whereby the end portions 12a of the pantograph 12 are gradually lifted to the vehicle side in the width direction D2 along the inclined surfaces 26a of the inclined surface portions 26, as shown in FIG. 3B, as the pantograph 12 advances, and then reach the surface 25a of the main surface portion 25. That is, the pantograph 12 being caught as shown in FIG. 4 is eliminated.

Further, since the inclined surface portions 26 are provided at all of the end portions of the main surface portion 25 and rise to the vehicle side in the width direction D2 toward the main surface portion 25, the pantograph 12 can smoothly advance to the surface 25a of the main surface portion 25, like going up a slope, and thereafter, smoothly advance from the surface 25a of the main surface portion 25, like going down a slope.

The pantograph 12 slides on the main surface portion 25, whereby carbon of the pantograph 12 sticks to the surface 25a of the main surface portion 25, and thus there is a possibility that the electric train lines 20 may electrically conduct to each other. However, since the groove 30 is formed in the main surface portion 25, it becomes possible to discharge the carbon to the outside of the main surface portion 25 through the groove 30, as indicated by an arrow Y in FIG. 2A.

In addition, in a case where the vehicle 2 travels in one direction (in the plane of FIG. 2A, from the left to the right) in the travel direction D1, the carbon is discharged toward the far side from the near side in the travel direction D1, as indicated by the arrow Y shown by a solid line. Further, in a case where the vehicle 2 travels in the other direction (in the plane of FIG. 2A, from the right to the left) in the travel direction D1, the carbon is discharged toward the far side from the near side in the travel direction D1, as indicated by the arrow Y shown by a dotted line.

In addition, since the groove 30 is formed in a lattice shape, even if the travel direction D1 of the vehicle 2 is either direction (either the left or the right in the plane of FIG. 2A), it is possible to reliably discharge the carbon stuck to the surface 25a of the main surface portion 25.

According to the track transportation system 1 of this embodiment described above, surface pressure can be reduced due to the main surface portion 25, the pantograph 12 can be prevented from being caught due to the inclined surface portions 26, and furthermore, an insulating state can be reliably maintained due to the groove 30. Therefore, it is possible to obtain an insulation effect and to suppress wear of the current collector.

In addition, in this embodiment, the groove 30 is formed in a lattice shape. However, it is not limited thereto, and for example, a groove may be formed parallel to the travel direction D1, and it is acceptable if the groove 30 is formed so as to connect the edge portions 25b of the main surface portion 25 such that it is possible to discharge the carbon to the outside of at least the main surface portion 25.

In addition, an elastic material such as electrically non-conductive rubber or urethane may be used for the surface 25a itself of the main surface portion 25. In this case, it becomes possible to further reduce surface pressure on the pantograph 12 when the pantograph comes into contact with the surface 25a of the main surface portion 25.

Further, it is acceptable if the width in the up-down direction D3 of the main surface portion 25 is made larger than the width in the up-down direction D3 of the pantograph 12 at least a portion of the main surface portion 25, and for example, the main surface portion 25 may have a complete rhombic shape when the main surface portion 25 is viewed from the width direction D2.

Next, modified examples of the insulating section 22 of this embodiment will be described. In each of the modified examples, the inclination angle and the inclination direction of the inclined surface portion are different from those of the inclined surface portion 26 described above. In addition, in these modified examples, illustration of the groove described above is omitted. However, the groove 30 may be formed in the same manner as that described above.

First Modified Example

Figure 5:
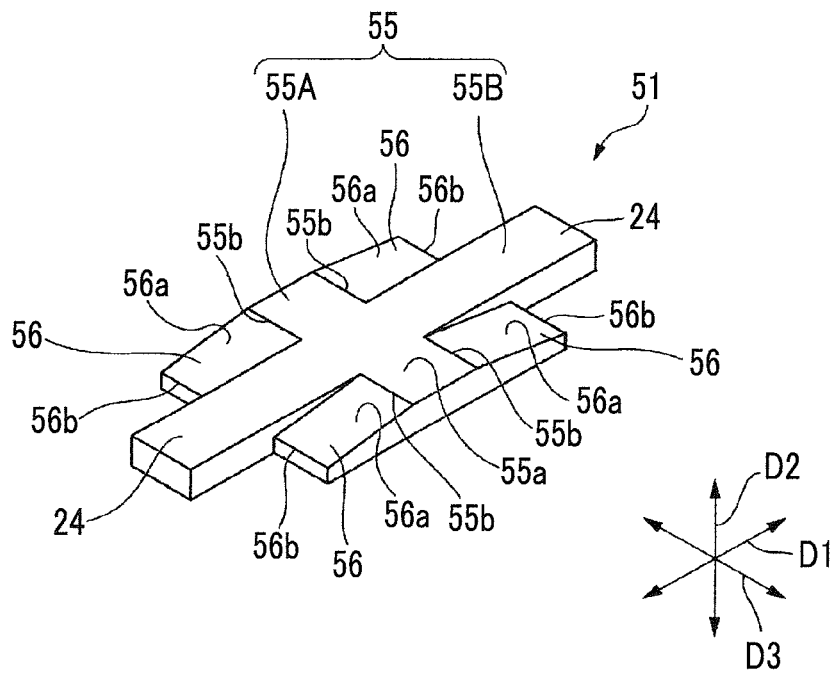
FIG. 5 is a perspective view showing a first modified example of the insulating section related to the track transportation system according to the first embodiment of the present invention.

As shown in FIG. 5, in an insulating section 51 according to a first modified example, an inclined surface 56a in an inclined surface portion 56 is gradually inclined toward the vehicle side in the width direction D2 along the travel direction D1. More specifically, the inclined surface 56a is gradually inclined from an edge portion 56b in the travel direction D1 of the insulating section 51 to the vehicle side in the width direction D2 along the travel direction D1 and is connected to an edge portion 55b of a main surface portion 55.

In this way, the main surface portion 55 has a first main surface portion 55A having a rectangular shape and extending in the up-down direction D3, and a second main surface portion 55B having a rectangular shape and extending in the travel direction D1, and the first main surface portion 55A and the second main surface portion 55B intersect each other at respective center positions, thereby forming a cross shape when viewed from the width direction D2.

Due to the inclined surface portions 56, the end portions 12a of the pantograph 12 with the surface 12b made in a concavely curved surface shape due to wear can smoothly advance to the surface 55a of the main surface portion 55, like going up a slope, and thereafter, smoothly advance from the surface 55a of the main surface portion 55, like going down a slope.

Second Modified Example

Figure 6A:
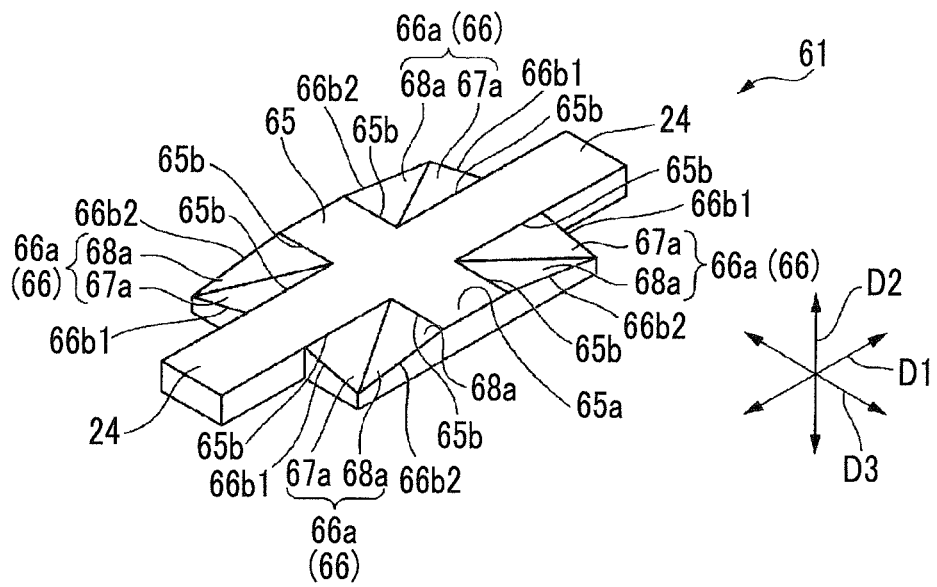
FIG. 6A is a perspective view showing a second modified example of the insulating section related to the track transportation system according to the first embodiment of the present invention.
Figure 6B:
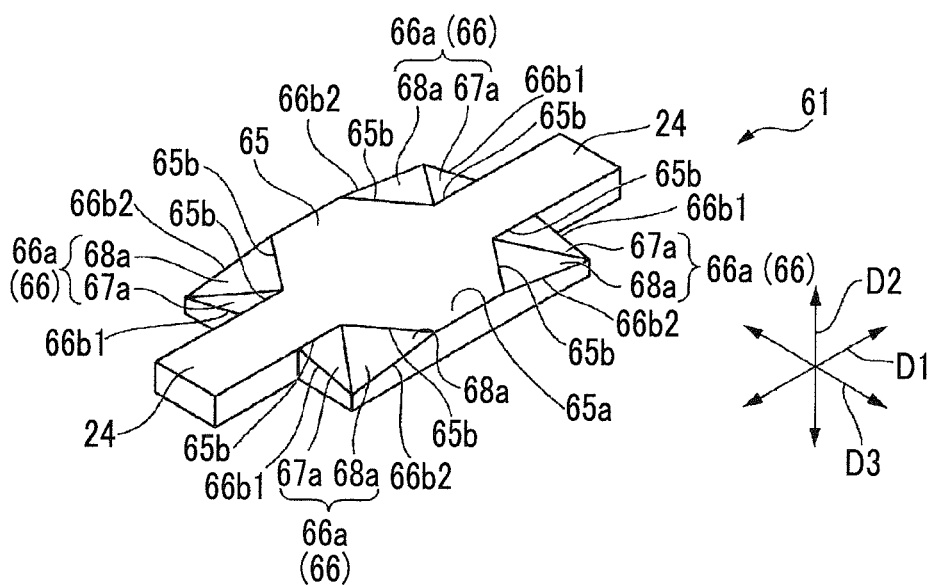
FIG. 6B is a perspective view showing the second modified example of the insulating section related to the track transportation system according to the first embodiment of the present invention and is a diagram showing a case where the angle of an inclined surface portion is different from that in FIG. 6A.
Figure 6C:
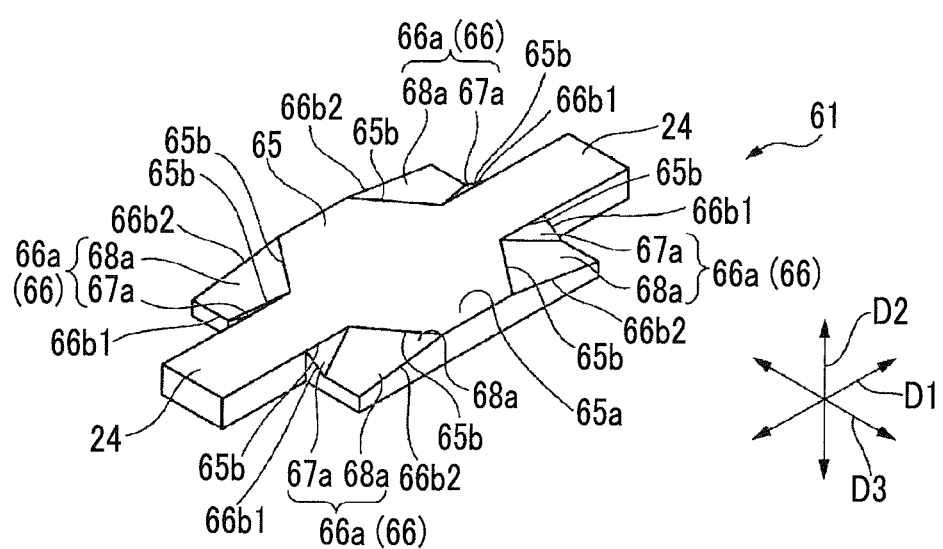
FIG. 6C is a perspective view showing the second modified example of the insulating section related to the track transportation system according to the first embodiment of the present invention and is a diagram showing a case where the angle of the inclined surface portion is different from those in FIGS. 6A and 6B.

Next, as shown in FIGS. 6A to 6C, in an insulating section 61 according to a second modified example, an inclined surface 66a of an inclined surface portion 66 has two surfaces, a first surface 67a and a second surface 68a.

The first surface 67a is connected, at one end in the travel direction D1, to an edge portion 66b1 on the travel direction D1 side of the inclined surface portion 66. The first surface 67a is connected, at one end in the up-down direction D3, to an edge portion 65b of a main surface portion 65 and is gradually inclined to the side opposite to the vehicle side in the width direction D2 as it goes toward the other end side from the one end.

Further, the second surface 68a is connected, at one end in the up-down direction D3, to an edge portion 66b2 on one side in the up-down direction D3 of the inclined surface portion 66. The second surface 68a is connected, at one end in the travel direction D1, to the edge portion 65b of the main surface portion 65 and is gradually inclined to the side opposite to the vehicle side in the width direction D2 as it goes toward the other end side in the travel direction D1 from the one end. The second surface 68a is connected to the first surface 67a.

Then, in the first surface 67a shown in FIG. 6A among FIGS. 6A to 6C, the dimension in the travel direction D1 of the portion which is one end in the up-down direction D3 and is connected to the main surface portion 65 is made to be the largest. Further, in the first surface 67a shown in FIG. 6B, the dimension in the travel direction D1 of the portion which is connected to the main surface portion 65 is made smaller than that in FIG. 6A, and in the first surface 67a shown in FIG. 6C, the dimension in the travel direction D1 of the portion which is connected to the main surface portion 65 is the same as that in the first surface 67a shown in FIG. 6B, and on the other hand, the dimension in the up-down direction D3 of the portion which is one end in the travel direction D1 and is connected to the edge portion 66b1 is made smaller than that in the first surface 67a shown in FIG. 6B.

Due to the inclined surface portions 66, when the worn pantograph 12 advances in the travel direction D1 while oscillating in the up-down direction D3, impact due to the end portions 12a of the worn pantograph 12 being caught in the main surface portion 65 can be prevented by the first surfaces 67a, and the pantograph 12 is guided to the main surface portion 65 by the first surfaces 67a, and thus damage to the pantograph 12 can be prevented.

Further, the dimension of the first surface 67a is appropriately changed as described above in consideration of the degree of wear of the pantograph 12 in the up-down direction D3, whereby damage to the pantograph 12 at the time of oscillation in the up-down direction D3 can be reliably prevented.

Further, due to the second surfaces 68a, the end portions 12a of the pantograph 12 with the surface 12b made in a concavely curved surface shape due to wear can smoothly advance to the surface 65a of the main surface portion 65, like going up a slope, and thereafter, smoothly advance from the surface 65a of the main surface portion 65, like going down a slope.

In addition, the shape of the second surface 68a also varies according to the shape of the first surface 67a and accordingly, the area of the surface 65a of the main surface portion 65 also changes, and therefore, surface pressure acting on the pantograph 12 also changes.

Third Modified Example

Figure 7A:
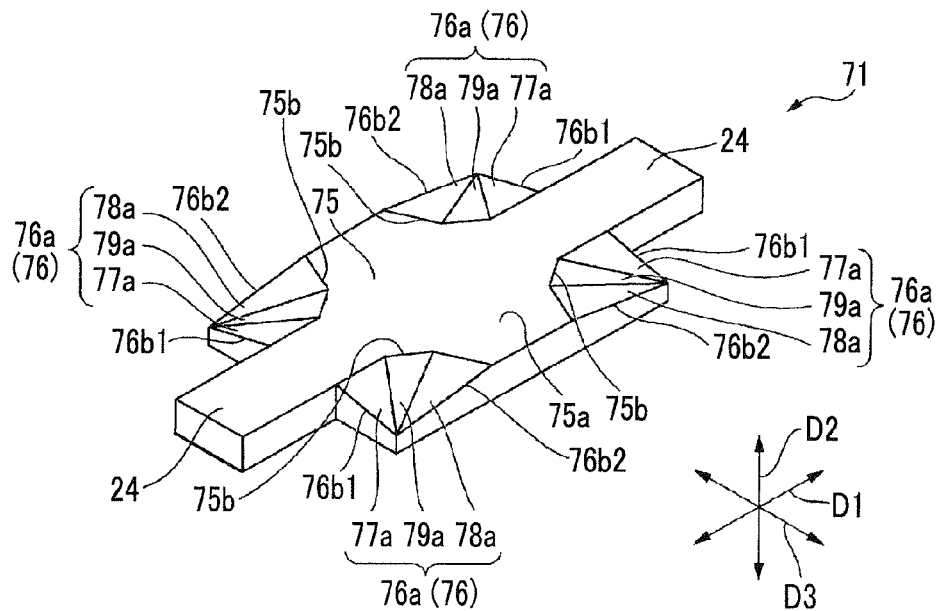
FIG. 7A is a perspective view showing a third modified example of the insulating section related to the track transportation system according to the first embodiment of the present invention.
Figure 7B:
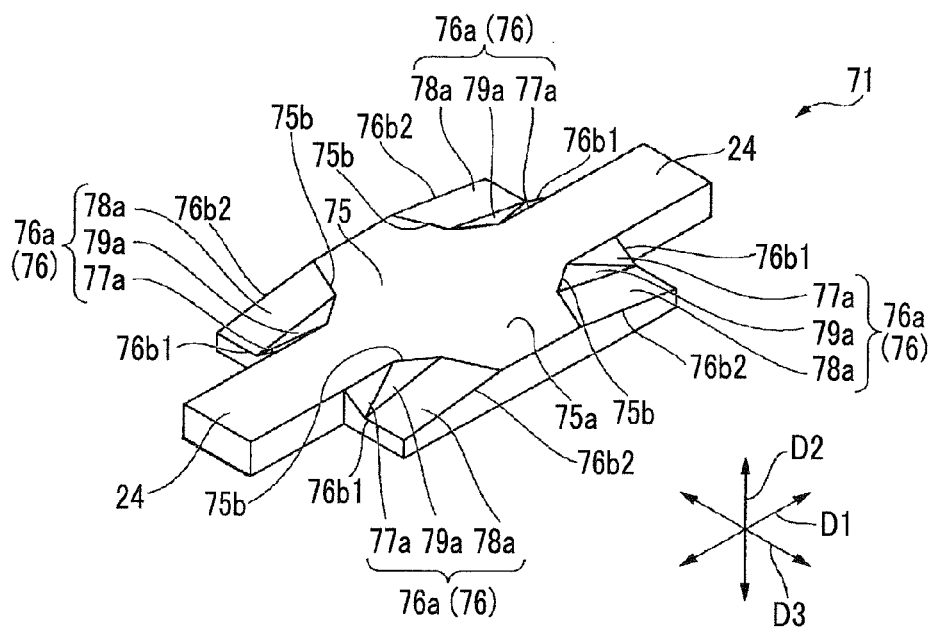
FIG. 7B is a perspective view showing the third modified example of the insulating section related to the track transportation system according to the first embodiment of the present invention and is a diagram showing a case where the angle of an inclined surface portion is different from that in FIG. 7A.

As shown in FIGS. 7A and 7B, in an insulating section 71 according to a third modified example, an inclined surface 76a of an inclined surface portion 76 has three surfaces, a first surface 77a, a second surface 78a, and a third surface 79a.

The first surface 77a is connected to an edge portion 76b1 on one end side in the travel direction D1 of the inclined surface portion 76. The first surface 77a is gradually inclined to the side opposite to the vehicle side in the width direction D2 as it goes toward the other end side in the up-down direction D3 from one end side in the up-down direction D3 connected to an edge portion 75b of a main surface portion 75. Further, the second surface 78a is connected to the edge portion 75b of the main surface portion 75 at one end and is gradually inclined from there to the side opposite to the vehicle side in the width direction D2 along the travel direction D1. Further, the second surface 78a is connected to an edge portion 76b2 in the up-down direction D3 of the inclined surface portion 76.

In addition, the third surface 79a is provided between the first surface 77a and the second surface 78a. The third surface 79a connects the first surface 77a and the second surface 78a. The third surface 79a is connected, at one end, to the edge portion 75b of the main surface portion 75 in a direction between the travel direction D1 and the width direction D2 and is gradually inclined to the side opposite to the vehicle side in the width direction D2 as it goes toward the other end from there.

Then, in the first surface 77a shown in FIG. 7B of FIGS. 7A and 7B, the dimension in the up-down direction D3 of the portion which is connected to the edge portion 76b1 is made smaller than that in FIG. 7A. Further, the third surface 79a shown in FIG. 7B is formed at a position closer to the main surface portion 75 in the up-down direction D3 than that shown in FIG. 7A.

Due to the inclined surface portions 76, when the worn pantograph 12 advances in the travel direction D1 while oscillating in the up-down direction D3, the end portions 12a of the worn pantograph 12 can be prevented from being caught in the main surface portion 75 due to the first surfaces 77a. In addition, due to the third surfaces 79a, the end portions 12a of the worn pantograph 12 can be prevented from being caught in the main surface portion 75 even with respect to the oscillation of the pantograph 12 in an oblique direction inclined from the up-down direction D3 to the travel direction D1 and the pantograph 12 is guided to the main surface portion 75, and thus damage to the pantograph 12 can be more reliably prevented. That is, due to the inclined surface portions 76, it becomes possible to more flexibly cope with the oscillation of the pantograph 12.

Further, the dimensions of the first surface 77a and the third surface 79a are appropriately changed as described above in consideration of the degree of wear of the pantograph 12 in the up-down direction D3, whereby damage at the time of oscillation of the pantograph 12 in the up-down direction D3 and an oblique direction between the up-down direction D3 and the travel direction D1 can be reliably prevented.

In addition, the shape of the second surface 78a also varies according to the shapes of the first surface 77a and the third surface 79a, and accordingly, the area of the surface 75a of the main surface portion 75 also changes, and therefore, surface pressure acting on the pantograph 12 also changes.

Fourth Modified Example

Figure 8A:
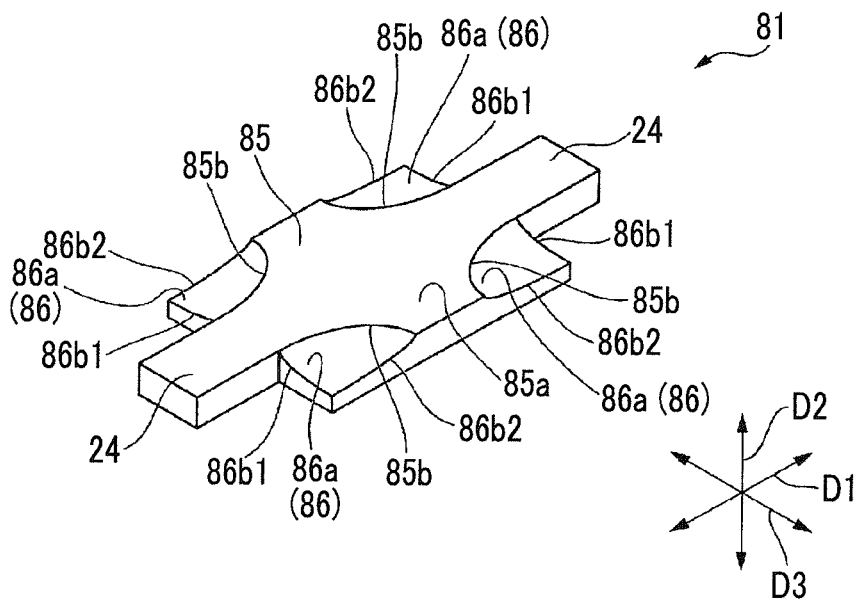
FIG. 8A is a perspective view showing a fourth modified example of the insulating section related to the track transportation system according to the first embodiment of the present invention.
Figure 8B:
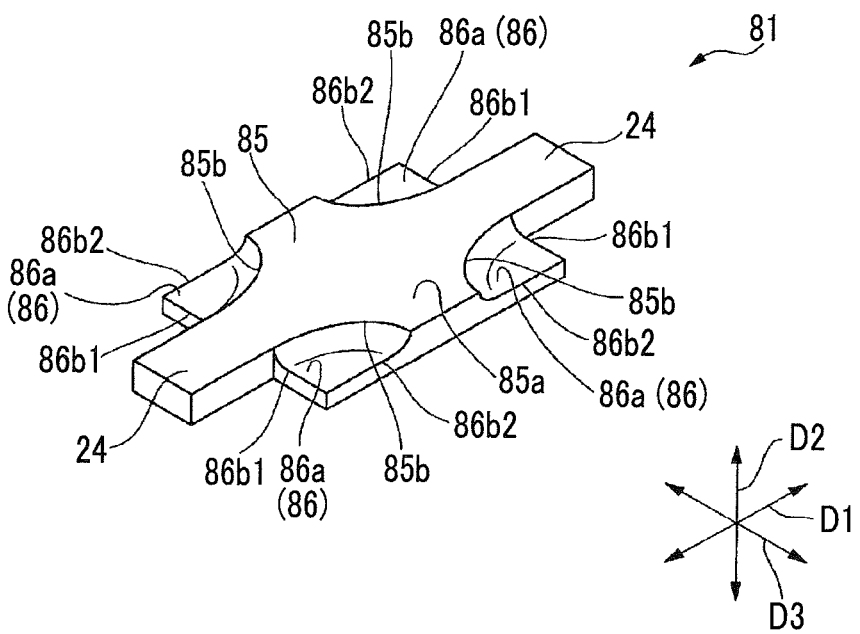
FIG. 8B is a perspective view showing the fourth modified example of the insulating section related to the track transportation system according to the first embodiment of the present invention and is a diagram showing a case where an inclined surface portion is different from that in FIG. 8A.

Further, as shown in FIGS. 8a and 8B, in an insulating section 81 according to a fourth modified example, an inclined surface 86a of an inclined surface portion 86 has a curved surface. That is, the inclined surface 86a is connected to an edge portion 86b1 on the travel direction D1 side of the inclined surface portion 86 and an edge portion 86b2 on the up-down direction D3 side. The inclination direction of the inclined surface 86a smoothly changes from the up-down direction D3 to the travel direction D1. The inclined surface 86a is gradually inclined smoothly from an edge portion 85b of a main surface portion 85 to the side opposite to the vehicle side in the width direction D2.

Then, the inclined surface 86a shown in FIG. 8A has a complete curved surface shape, and the inclined surface 86a shown in FIG. 8B is formed such that a portion from the edge portions 86b1 and 86b2 to a midway position toward the travel direction D1 and the up-down direction D3 is formed as a surface parallel to the surface 85a of the main surface portion 85 without being inclined in the width direction D2 and a subsequent portion has a curved surface which is gradually inclined smoothly to the vehicle side in the width direction D2 along the travel direction D1 and the up-down direction D3.

Due to the inclined surface portions 86, when the worn pantograph 12 advances in the travel direction D1 while oscillating in the up-down direction D3, the end portions 12a of the worn pantograph 12 can be prevented from being caught in the main surface portion 85 and the pantograph 12 can be guided to the main surface portion 85.

In addition, the inclined surface 86a of the inclined surface portion 86 has a curved surface, whereby it is possible to more flexibly cope with the oscillation of the pantograph 12 in any oblique direction between the up-down direction D3 and the travel direction D1.

Next, a track transportation system 101 according to a second embodiment of the present invention will be described. In addition, a constituent element shared by the first embodiment is denoted by the same reference numeral and the detailed description thereof is omitted. This embodiment is different from the first embodiment in that an insulating section 102 is divided into plural portions and elastic portions are further provided in the divided portions and on the inside.

Figure 9:
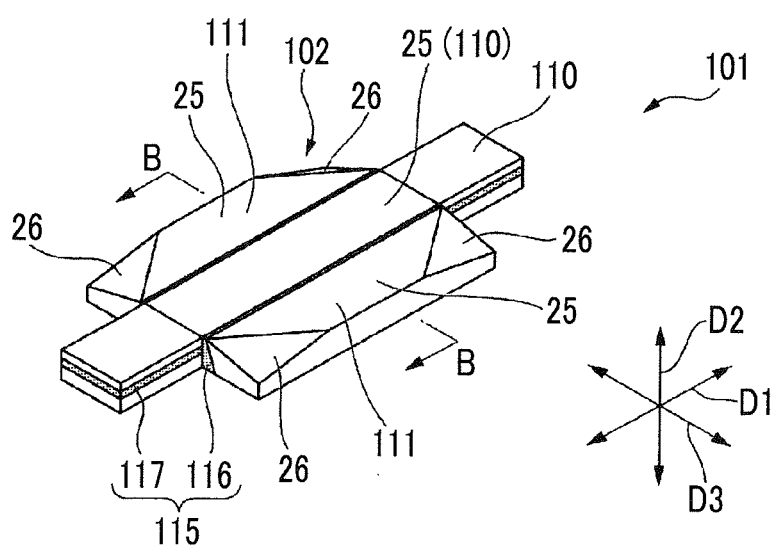
FIG. 9 is a perspective view of an insulating section related to a track transportation system according to a second embodiment of the present invention.

As shown in FIG. 9, the insulating section 102 has substantially the same outer shape as the insulating section 22 of the first embodiment. Further, the insulating section 102 is configured to have a main body portion (a first portion) 110 in which positions in the up-down direction D3 coincide with the position of the electric train line 20, that is, which is connected to an extended line of the electric train line 20 in the travel direction D1, and overhang portions (second portions) 111 protruding from the main body portion 110 to both sides in the up-down direction D3.

Here, the inclined surface portions 26 are located at the overhang portions 111, and the main surface portion is divided into the main body portion 110 and the overhang portions 111.

Figure 10A:
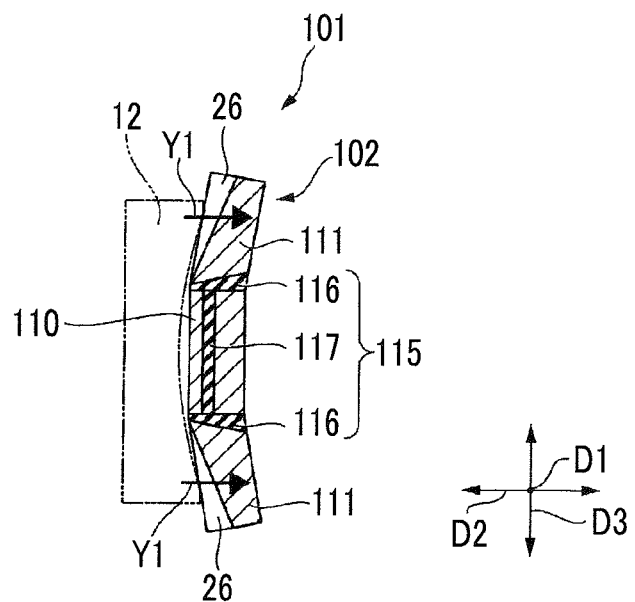
FIG. 10A is a cross-sectional view taken along line B-B of FIG. 9, showing the relationship between the insulating section and the current collector related to the track transportation system according to the second embodiment of the present invention, and is a diagram showing a state where wear of the current collector has progressed.
Figure 10B:
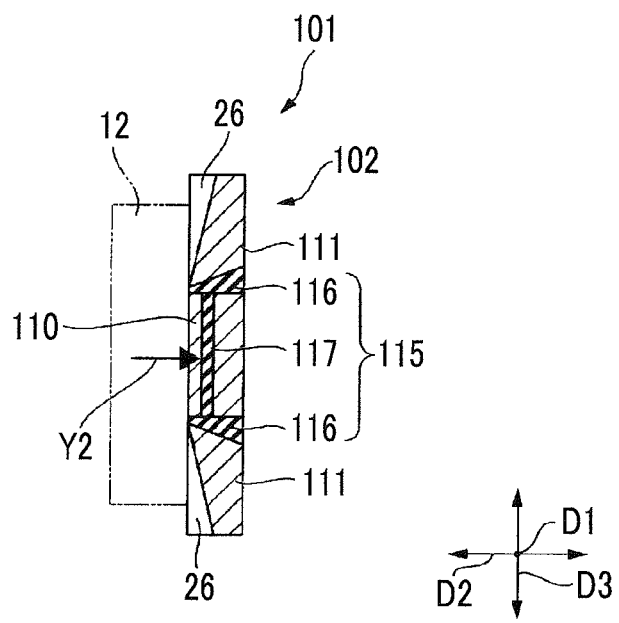
FIG. 10B is a cross-sectional view taken along line B-B of FIG. 9, showing the relationship between the insulating section and the current collector related to the track transportation system according to the second embodiment of the present invention, and is a diagram showing a state where the current collector is not worn.

As shown in FIGS. 9, 10A, and 10B, an elastic portion 115 is formed by cure adhesion or the like of, for example, rubber. The elastic portion 115 is provided over the entire area in the travel direction D1 and the width direction D2 between the main body portion 110 and the overhang portions 111. The elastic portion 115 has a first elastic member 116 joining the main body portion 110 and each of the overhang portions 111 together, and a second elastic member 117 inserted into the main body portion 110 at a midway position in the width direction D2 of the main body portion 110.

In the first elastic member 116, a cross-sectional shape as viewed from the travel direction D1 has a substantially triangular shape gradually spreading in the up-down direction D3 as it goes toward the direction opposite to the vehicle side in the width direction D2.

The second elastic member 117 is provided over the entire area in the travel direction D1 and the up-down direction D3 in the main body portion 110 and has a rectangular cross-sectional shape when viewed from the travel direction D1.

Further, in this embodiment, the two first elastic members 116 provided on both sides in the up-down direction D3 with respect to the main body portion 110 are joined to the second elastic member 117, and thus the first elastic members 116 and the second elastic member 117 are integrated.

In the track transportation system 101, as shown in FIG. 10A, in a case where the degree of wear of the pantograph 12 is particularly large and thus the curvature of the concavely curved surface becomes large, the end portions 12a of the pantograph 12 push the overhang portions 111 out to the side opposite to the vehicle side in the width direction D2 (in a direction of an arrow Y1). In this case, the first elastic member 116 is provided between the main body portion 110 and each of the overhang portions 111, whereby the overhang portion 111 is bent to the side opposite to the vehicle side in the width direction D2 so as to be separated from the vehicle 2 in the width direction D2, and thus it is possible to mitigate impact at the time of contact of the pantograph 12.

Further, as shown in FIG. 10B, for example, in a case where the pantograph 12 is not worn, the pantograph pushes the main body portion 110 out to the side opposite to the vehicle side in the width direction D2 (in a direction of an arrow Y2).

In this case, the second elastic member 117 is provided in the main body portion 110, whereby it is possible to mitigate impact at the time of contact of the pantograph 12 at the center position of the pantograph 12.

Further, since the first elastic members 116 on both sides in the up-down direction D3 are joined to each other by the second elastic member 117, falling-off of the first elastic members 116 can be prevented, thereby leading to improvement in durability and reliability.

According to the track transportation system 101 of this embodiment, the insulating section 102 has a divided structure and the elastic portion 115 is used, whereby it is possible to suppress damage to the pantograph 12 while reliably performing insulation.

In addition, regarding to the elastic portion 115, the first elastic member 116 and the second elastic member 117 need not both be necessarily provided and only one of them may be provided.

Further, the first elastic member 116 and the second elastic member 117 may not be joined to each other.

In addition, the cross-sectional shapes of the first elastic member 116 and the second elastic member 117 are not limited to the above-described shapes, and the cross-sectional shape as viewed from the travel direction D1 of, for example, the first elastic member 116 may be a rectangular shape.

Further, the elastic portion 115 is not limited to a case of being rubber and may be configured with, for example, a coil spring or a leaf spring.

The details of the embodiments of the present invention have been described above. However, some changes in design are also possible within a scope which does not depart from the technical idea of the present invention.

For example, in the present invention, the inclined surface portions 26 (56, 66, 76, or 86) are provided at all of the end portions in the travel direction D1 and the up-down direction D3 of the main surface portion 25 (55, 65, 75, or 85). However, in a case where the travel direction D1 of the vehicle 2 is only one direction (either the left or the right in the planes of FIGS. 2A and 2B), the inclined surface portions 26 (56, 66, 76, or 86) may be provided only on the near side in the travel direction of the vehicle 2 in the main surface portion 25 (55, 65, 75, or 85). In this way, it is possible to mitigate impact on at least the near side in the travel direction D1.

Further, in each of the embodiments described above, the new transportation system of a side guide type has been described as an example. However, a center guide type or an automatic steering type with no guide is also acceptable. In addition, the insulating section can also be applied to a railway vehicle in which the pantograph is provided above the vehicle 2.

In addition, the elastic portion 115 of the second embodiment may be applied to the insulating sections 51, 61, 71, and 81 of the modified examples of the first embodiment.

INDUSTRIAL APPLICABILITY

The insulating section, the power feeding rail, and the track transportation system described above can be applied to a power feeding rail which performs power feeding from a lateral electric train line with respect to a vehicle, an insulating section thereof, and a track transportation system using the power feeding rail and the insulating section. The insulating section, the power feeding rail, and the track transportation system described above are particularly suitable for an insulating section, a power feeding rail, and a track transportation system in which it is possible to suppress wear of a current collector while reliably performing insulation.

REFERENCE SIGNS LIST

1: track transportation system
2: vehicle
3: track
10: traveling wheel
11: guide wheel
12: pantograph (current collector)
13: guide rail
14: power feeding rail
20: electric train line
20a: current-conducting surface
21: connection plate
21a: bolt
21b: nut
22: insulating section
24: connection portion
25: main surface portion
26: inclined surface portion
26a: inclined surface
30: groove
D1: travel direction
D2: width direction
D3: up-down direction (orthogonal direction)
51: insulating section
55: main surface portion
55A: first main surface portion
55B: second main surface portion
56: inclined surface portion 56a: inclined surface
61: insulating section
65: main surface portion
66: inclined surface portion
66a: inclined surface
67a: first surface
68a: second surface
71: insulating section
75: main surface portion
76: inclined surface portion
76a: inclined surface
77a: first surface
78a: second surface
79a: third surface
81: insulating section
85: main surface portion
86: inclined surface portion
86a: inclined surface
101: track transportation system
102: insulating section
110: main body portion (first portion)
111: overhang portion (second portion)
115: elastic portion
116: first elastic member
117: second elastic member
Y: arrow
Y1: arrow
Y2: arrow

The invention claimed is:

1. An insulating section which is provided to extend along a travel direction of a vehicle and connects electric train lines coming into contact with a current collector of the vehicle at a contact surface facing the vehicle, comprising:
    a main surface portion formed on a surface which follows a current-conducting surface coming into contact with the current collector in the electric train line, and having a portion in which a width in an orthogonal direction orthogonal to the travel direction of the surface following the current-conducting surface is larger than a width of the current collector; and
    inclined surface portions provided on both sides in the orthogonal direction on at least the near side in the travel direction of the main surface portion, each having an inclined surface inclined so as to gradually approach the vehicle as it goes toward the far side from the near side in the travel direction, and connected to the main surface portion.

2. The insulating section according to claim 1, wherein the main surface portion is formed of an elastic material.

3. The insulating section according to claim 1, wherein a groove recessed from the main surface portion is formed in the main surface portion.

4. The insulating section according to claim 3, wherein the groove is inclined in the orthogonal direction with respect to the travel direction.

5. The insulating section according to claim 4, wherein the groove is formed in a lattice shape.

6. The insulating section according to claim 1, wherein each of the inclined surface portions has, as the inclined surface, a first surface in which an inclination direction is directed in the orthogonal direction, and a second surface in which an inclination direction is directed in the travel direction.

7. The insulating section according to claim 6, wherein each of the inclined surface portions further has, as the inclined surface, a third surface which is inclined so as to connect the first surface and the second surface.

8. The insulating section according to claim 1, wherein each of the inclined surface portions has, as the inclined surface, a curved surface in which an inclination direction smoothly changes from the orthogonal direction to the travel direction.

9. The insulating section according to 1, further comprising:
    a first portion which is connected to the electric train lines;
    a second portion which overhangs from the first portion further in the orthogonal direction than the electric train lines; and
    a first elastic member which is provided between the first portion and the second portion and is elastically deformed, thereby relatively moving the second portion in a direction of being separated from the vehicle.

10. The insulating section according to claim 9, further comprising:
    a second elastic member which is provided in the first portion and elastically deformed, thereby relatively moving the first portion in a direction of being separated from the vehicle.

11. A power feeding rail comprising:
    a plurality of electric train lines coming into contact with a current collector of a vehicle; and
    the insulating section according to claim 1, which connects the electric train lines.

12. A track transportation system comprising:
    the power feeding rail according to claim 11; and
    a vehicle traveling by receiving power from the power feeding rail.

* * * * *